Patented Sept. 5, 1950

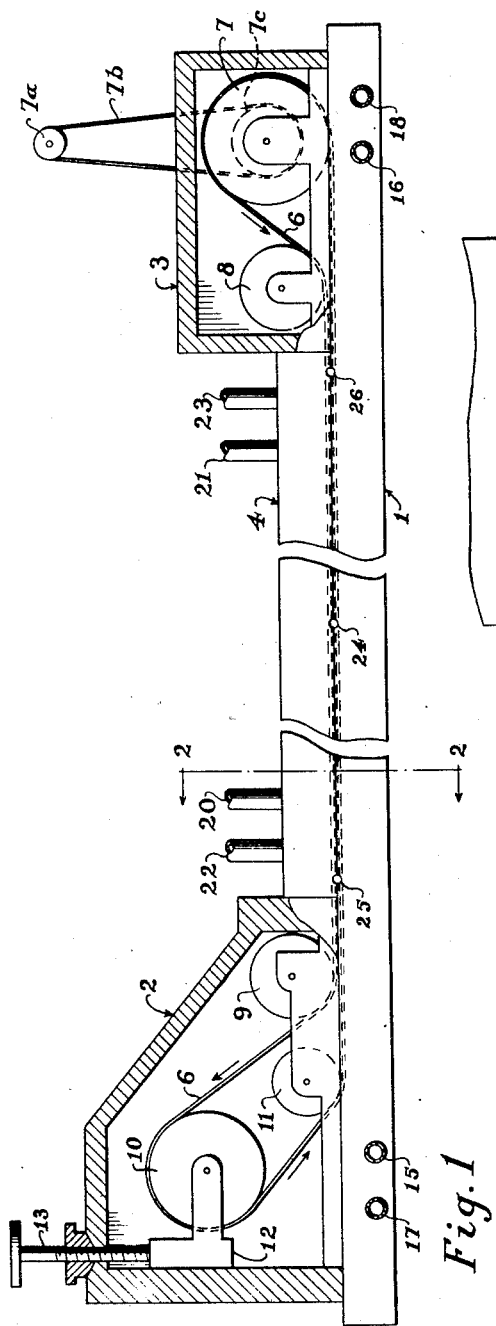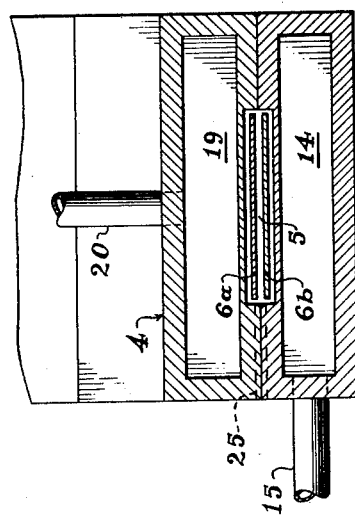

2,521,112

UNITED STATES PATENT OFFICE 2,521,112

METHOD AND APPARATUS FOR SEPARATING FLUIDS BY THERMAL DIFFUSION

Jesse W. Beams, Charlottesville, Va., assignor to the United States of America as represented by the United States Atomic Energy Commission Application April 18, 1944, Serial No. 531,672

6 Claims. (Cl. 210—52.5)

This invention relates to new and useful improvements in methods and apparatus for separating fluid mixtures by thermal diffusion.

It is well known that when a fluid mixture is subjected to a temperature differential, the mixture undergoes changes in composition at the places of different temperature by reason of thermal diffusion, and it has been proposed to separate fluid mixtures by thermal diffusion into a fraction enriched in one component of the mixture on the one hand and a component substantially impoverished of said one component on the other hand.

Several methods have been proposed for separating fluid mixtures by thermal diffusion. One such method contemplates passing the fluid mixture to be separated through a transverse temperature gradient so that the separation fractions produced travel through the gradient in the same direction. Another, and more effective proposal contemplates the separation of fluid mixtures by thermal diffusion wherein the warmer and cooler fractions of the mixtures are conducted along each other countercurrent, or in opposite directions, and drawn off separately at the ends of their respective courses.

With the foregoing in mind, the principal object of the present invention is to provide an improved method and apparatus for separating fluid mixtures by thermal diffusion wherein the separation fractions produced are conducted countercurrent along each other and separately drawn off at the ends of their respective courses.

Another object of the invention is to provide an improved method of the character set forth for separating fluid mixtures by thermal diffusion that is practical and efficient.

Another object of the invention is to provide an improved apparatus for separating fluid mixtures by thermal diffusion that is characterized by its relatively simple, inexpensive construction, and its continuity of operation.

These and other objects of the invention, and the various features and details of the method and apparatus, are hereinafter fully set forth and described with reference to the accompanying drawing, in which:

Fig. 1 is a side elevation view, partially in section, through one form of apparatus embodying the present invention; and Fig. 2 is an enlarged sectional view taken in line 2—2, Fig. 1.

Referring now more particularly to the drawing, there is illustrated, substantially diagrammatically, a suitable apparatus for practicing the method of the present invention that comprises an elongated hollow base member 1 of rectangular cross-section on which are mounted relatively spaced end housing structures 2 and 3, respectively, and an intermediate elongated hollow member 4 having a cross-sectional shape and dimensions conforming substantially to those of the base member 1 (see Fig. 2).

As more clearly shown in Fig. 2, the abutting faces or surfaces of the members 1 and 4 are provided with corresponding recesses lengthwise therein that cooperate with one another to form an elongated fluid separation chamber 5 of very shallow height that communicate at its opposite ends with the interiors of the housing structures 2 and 3, respectively.

Mounted for movement longitudinally through the fluid separation chamber 5, in relatively superimposed, slightly spaced, parallel relation, are the oppositely moving courses 6a and 6b of an endless tape 6 that is composed of metal or other suitable thermally conductive material. In the illustrated embodiment of an apparatus for practicing the invention, the endless tape 6 moves rectilinearly in a generally counter-clockwise direction. Thus the lower course 6b of the tape 6 moves rectilinearly to the right with respect to Fig. 1 of the drawings and emerges from the chamber 5 into the housing structure 3 where it passes beneath and upwardly about a drive roll 7 that is driven in the direction of the arrow by any suitable source of rotary motion such as, for example, a pulley 7a and belt 7b that drives a pulley 7c associated with said roll 7.

Leaving the drive roll 7, the tape 6, the direction of travel thereof having been reversed, passes beneath an idler roll 8, and then traverses the upper tape course 6a in a left-ward direction through the separation chamber 5 from which it emerges and enters the other housing structure 2. Upon entering the housing 2, the tape 6 passes beneath an idler roll 9, about a guide roll 10, and then beneath an idler roll 11 whence it again traverses the lower tape course 6b in a righthand direction through the chamber 5. Suitable means, for example, gaskets or the like (not shown), are provided at opposite ends of the separation chamber 5 to render the latter fluid-tight, and to prevent the tape courses 6a and 6b from conducting gas or liquid from the chamber 5 into the end housings 2 and 3 respectively.

For the purpose of controlling and regulating the tension of the tape 6, for example, to maintain the upper tape course 6a relatively taut and prevent it from sagging against the lower tape course 6b, the guide roll 10 preferably is mounted in a vertically slidable support 12 that may be adjusted by any suitable mechanism such as a jack screw or the like 13.

The hollow base member 1 provides an elongated chamber 14 for the circulation of a suitable cooling fluid, such as, for example, cold water. For this purpose, inlet ducts 15 and 16 for admitting cooling fluid to the chamber 14 are provided in the member 1 adjacent respectively opposite ends thereof, and outlet ducts 17 and 18 likewise are provided adjacent opposite ends of the member 1 outwardly or endwise of the inlet ducts 15 and 16.

The hollow member 4 that cooperates with the member 1 to form the fluid chamber 5 likewise provides an elongated chamber 19 for the circulation therethrough of a suitable heating fluid such as, for example, hot water or the like, and for this purpose, inlet ducts 20 and 21 for the heating fluid are provided in the member 4 adjacent opposite ends thereof, respectively, while outlet ducts 22 and 23 are provided in said member 4 outwardly or endwise of the inlet ducts 20 and 21.

By virtue of these constructions it will be observed that a heating fluid circulated through the chamber 19 operates to maintain the portion of the tape 6 moving through the upper course 6a thereof at a relatively warm temperature, and that the cooling fluid circulated through the chamber 14 operates to maintain the tape portion traversing the lower course 6b at a relatively cooler temperature. A temperature differential thus exists between the upper and lower tape courses 6a and 6b, respectively, and by controlling the temperatures of the cooling and heating fluids circulated through the chambers 14 and 19, the desired temperature differential or gradient may be maintained between the upper and lower courses of the tape 6 within the fluid separation chamber 5. The provision of inlet ducts adjacent the opposite ends of both of the circulating chambers 14 and 19 is made to eliminate, within practical limits, the existence of any substantial temperature gradient in the tape courses 6a and 6b lengthwise of the fluid separation chamber 5.

Fluid mixtures, in gaseous or liquid form, to be separated in the chamber 5 are introduced into the latter and between the tape courses 6a and 6b through a suitable duct 24 that is located centrally along the length of said chamber 5 and, in the illustrated embodiment of the apparatus of the invention, formed by complementary registering grooves provided in the abutting surfaces of the members 1 and 4, respectively. For withdrawing the separation fractions of the fluid mixture from the separation chamber 5, suitable outlet ducts 25 and 26 are provided adjacent opposite ends of the chamber 5, and in the apparatus illustrated these outlet ducts are formed, as is the inlet duct 24, by complementary grooves similarly provided in the abutting faces of the members 1 and 4.

In practicing the method of the invention, with the tape 6 moving at a predetermined constant rate of travel and with the upper and lower tape courses 6a and 6b heated and cooled, respectively, to produce a predetermined temperature differential therebetween, the gaseous or liquid mixture that is to be separated is introduced through the duct 24 into the separation chamber 5 and between the tape courses 6a and 6b. As the mixture is introduced between the tape courses 6a and 6b, the difference in the temperature thereof operates by thermal diffusion to bring about a variation in concentration of the mixture in a vertical direction with the result that the heavier component of the mixture accumulates along the cooled course 6b of the tape 6, and the lighter component accumulates along the heated or warmer course 6a thereof. At the same time the warmed, lighter component of the mixture adjacent the heated course of the moving tape, due to the discous drag, is carried leftward by the upper course 6a of the tape 6 to the outlet duct 25 through which it is withdrawn from the chamber 5, and the cooled, heavier component is similarly carried to the right by the lower course 6b of the tape 6 to the other outlet duct 26 where it likewise is withdrawn from the chamber 5. Furthermore, due to the continuous thermal temperature gradient between the tape courses, it is important to note that as the lighter and heavier components of the mixture are carried in opposite directions toward their outlet ducts by the upper and lower tape courses 6a and 6b, respectively, the upper or lighter fraction is progressively enriched in the lighter component of the mixture while the lower or heavier fraction is progressively enriched in the heavier component thereof. In this manner there is produced on the one hand a separation fraction substantially enriched in one component of the fluid mixture, and on the other hand a separation fraction impoverished of said one component of the mixture and substantially enriched in the other component thereof.

From the foregoing it will be observed that the present invention provides a novel method for separating fluid mixtures by thermal diffusion that is practical and efficient, and may be practiced by the employment of novel apparatus that is characterized by its relatively simple, inexpensive construction, and its continuity of operation.

In practicing the invention, it will be obvious that, except for the natural tendency for the lighter warmed components of a mixture to rise and the heavier cooled components thereof to fall, it is immaterial whether the upper tape course 6a is heated and the lower course 6b is cooled as described, or vice versa, so long as the two surfaces are maintained at relatively different temperatures. Nor is it necessary that an endless tape be employed since two tapes of indefinite length may be employed with satisfactory results. Moreover, the separate fractions need not necessarily be carried counter current along each other in horizontal direction.

It has been found that the method and apparatus herein disclosed may, for example, be employed effectively in the separation of acqueous solutions of both zinc-sulfate and sugar.

I claim:

1. Apparatus for separating fluid mixtures by thermal diffusion, comprising means defining an elongated separation chamber having an inlet duct for fluid mixtures approximately midway therealong and outlet ducts adjacent opposite ends thereof, a pair of vertically spaced upper and lower parallel members, said members being closely spaced, thermally conducting and extending lengthwise through said chamber, means to maintain said upper member at a higher temperature than said lower member to concentrate relatively lighter and heavier components of a mixture adjacent the warmer and cooler members respectively, and means for moving said members rectilinearly in respectively opposite directions to conduct said lighter and heavier components counter current to each other to said outlet ducts.

2. Apparatus for separating fluid mixtures by thermal diffusion, comprising means defining an elongated separation chamber having an inlet duct for fluid mixtures approximately midway therealong and outlet ducts adjacent opposite ends thereof, a thermally conducting endless tape having reversely directed upper and lower rectilinear courses thereof extending through said chamber in closely spaced parallel relation, means to maintain said upper course at a higher temperature than said lower course to concentrate relatively lighter and heavier components of a mixture adjacent the warmer and cooler tape courses respectively, and means for moving said tape courses in respectively opposite directions to conduct said lighter and heavier components of the mixture to said outlet ducts.

3. Apparatus for separating fluid mixtures by thermal diffusion, comprising means defining an elongated separation chamber having an inlet duct for fluid mixtures approximately midway therealong and outlet ducts adjacent opposite ends thereof, a pair of vertically spaced upper and lower parallel members, said members being closely spaced thermally conducting and extending lengthwise through said chamber, a circulating chamber for heating fluid adjacent the upper member to heat the same, means providing a circulating chamber for cooling fluid adjacent the lower member to cool the same, the different temperatures of said members operating to concentrate relatively lighter and heavier components of a mixture adjacent the warmer and cooler members respectively, and means for moving said members rectilinearly in respectively opposite directions to conduct said lighter and heavier components counter current to each other to said outlet ducts.

4. Apparatus for separating fluid mixtures by thermal diffusion, comprising means defining an elongated separation chamber having an inlet duct for fluid mixtures approximately midway therealong and outlet ducts adjacent opposite ends thereof, a thermally conducting endless tape having reversely directed upper and lower rectilinear courses thereof extending through said chamber in closely spaced parallel relation, a circulating chamber for heating fluid adjacent the upper of said tape courses to heat the same, a circulating chamber for cooling fluid adjacent the other of said tape courses to cool the same, the different temperatures of said tape courses operating to concentrate relatively lighter and heavier components of a mixture adjacent the warmer and cooler tape courses respectively, and means for moving said tape courses in respectively opposite directions to conduct said lighter and heavier components of the mixture to said outlet ducts.

5. A method for separating fluid mixtures by thermal diffusion, which comprises introducing a fluid mixture into a separation zone, confining a body of said fluid mixture between two vertically spaced elongated thermally conducting parallel members, maintaining the upper of said members at a higher temperature than the lower member to concentrate relatively lighter and heavier components of the mixture adjacent the warmer and cooler members respectively, moving said members rectilinearly in respectively opposite directions to conduct said lighter and heavier components counter current to each other, and withdrawing the lighter component from adjacent one end of said body and the heavier component from adjacent the other end thereof.

6. A method for separating fluid mixtures by diffusion, which comprises introducing a fluid mixture into a separation zone, confining a body of said fluid mixture between upper and lower thermally conducting parallel members, said members being in continuous rectilinear movement in opposite directions, maintaining the upper member at a higher temperature than the lower member to concentrate relatively lighter and heavier components of the mixture adjacent the warmer and cooler members respectively, utilizing the movement of said members to conduct said lighter and heavier components counter current to each other, and withdrawing the lighter component from adjacent one end of said body and the heavier component from adjacent the other end thereof.

JESSE W. BEAMS.

REFERENCES CITED

The following references are of record in the file of this patent:

UNITED STATES PATENTS

| Number | Name | Date |
| --- | --- | --- |
| 2,073,327 | Vigers | Mar. 9, 1937 |
| 2,258,594 | Brewer et al. | Oct. 14, 1941 |
| 2,268,134 | Clusius | Dec. 30, 1941 |

OTHER REFERENCES

Carr: Thermal Diffusion in Liquids, Journal of Chemical Physics, vol. 12, Aug. 1, 1944, page 349.